Jan. 23, 1934. A. H. NEULAND Re. 19,063

POWER TRANSMISSION DEVICE

Original Filed Jan. 22, 1927

Inventor

ALFONS H. NEULAND

By Ralph B. Stewart

Attorney

Reissued Jan. 23, 1934

Re. 19,063

UNITED STATES PATENT OFFICE 19,063

POWER TRANSMISSION DEVICE

Alfons H. Neuland, Irvington, N. J., assignor, by mesne assignments, to Electrogear Corporation, a corporation of Delaware Original No. 1,784,309, dated December 9, 1930, Serial No. 162,788, January 22, 1927. Application for reissue December 6, 1932. Serial No. 645,998

24 Claims. (Cl. 172—239)

My invention relates to transmission devices and particularly to means for supplying a load shaft with energy at variable torque and speed, from a power source of a different, or a constant, torque and variable speed.

My invention is particularly adapted to use with a power source such as an internal combustion engine for transferring power from the engine to the wheels of an automotive vehicle. My invention is, however, equally applicable to other uses which require modification of the torque-speed characteristics of power in the course of its transfer from a power source to a load shaft. It may be used advantageously for such purposes as the operation of elevators and other machines by such power sources as electric motors which have a substantially constant speed and a limited torque.

My invention provides means for the transfer of power from a power source to a load, means for variably transforming the torque and speed relations between the power source and the load and additional means for controlling this relationship according to the speed and magnitude of the load. My invention also provides means for adjusting the rate of change between the torque and speed of the prime mover and the load.

My invention provides, in addition for auxiliary functions. It is adapted, when operated in conjunction with an internal combustion engine, to start the engine. It is likewise adapted to the exertion of a braking force upon the load shaft and to various functions which will later appear.

My invention provides a direct transfer means for transmitting energy from the prime mover to the load at a speed difference and an indirect transfer means for the flow of the differential energy, that is, the energy represented by the speed difference, between prime mover and load, and means actuated by the movement of the load for varying and reversing the flow of differential energy between prime mover and load.

A practical embodiment of my invention provides a clutch dynamo, one element of which is driven by the prime mover and the other arranged to drive the load, and a booster, one element of which is operatively connected to the prime mover while the other is held stationary. A regulating dynamo for the booster is provided and driven by the load shaft.

The clutch dynamo and booster are electrically connected and arranged to change their functions. When the load shaft demands a torque exceeding that of the prime mover, the clutch dynamo operates as a generator and supplies electrical energy to the booster which operates as a motor and amplifies the prime mover torque applied to the clutch dynamo and therefore to the load. As the load speeds up the regulating dynamo energizes the booster field in opposition to the motor field and finally reverses the booster field flux. The booster now delivers electrical energy to the clutch dynamo and causes the load to overspeed the prime mover.

Figure 1:
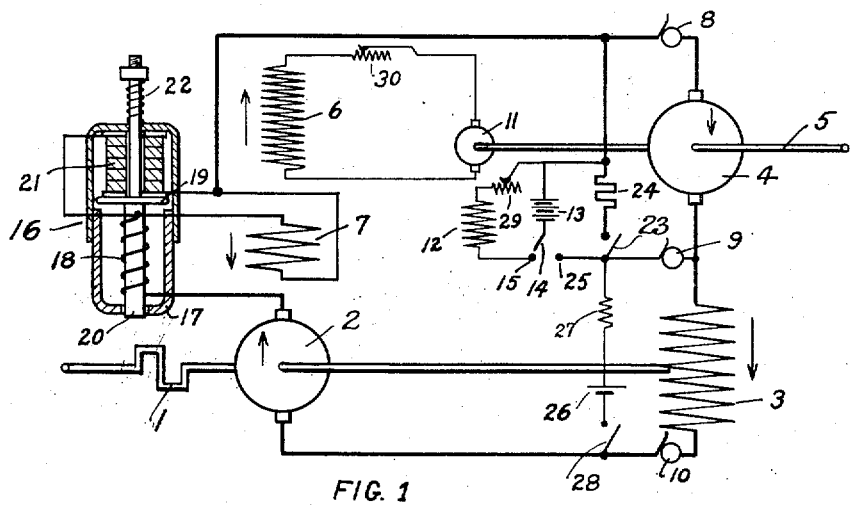
Figure 2:
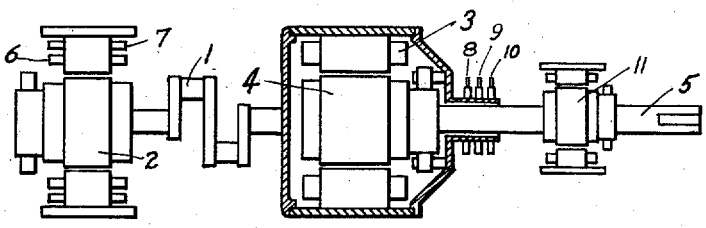

Other objects of my invention will be apparent from the following description when read in connection with the accompanying drawing, wherein Fig. 1 is a diagrammatic representation of the circuits and apparatus of one embodiment of my invention, and Fig. 2 is a diagrammatic representation in section of an embodiment of the apparatus of my invention.

Referring to Figures 1 and 2, 1 is the crank shaft of an internal combustion engine to which is mechanically connected the armature 2 of the booster, as well as the field element of the clutch dynamo, including the series field coil 3. The armature 4 of the clutch dynamo is mechanically connected to and drives the load shaft 5. The stationary field element of the booster is provided with an auxiliary separately excited coil 6 and a series coil 7 so that the main circuit traversed by the load current comprises the clutch armature 4, clutch series field 3, booster armature 2, its series field coil 7 and back to armature 4. Inasmuch as the armature 4 and field 3 of the clutch dynamo rotate, the connections are made through slip rings 8, 9, 10.

In this description, I prefer to identify certain elements of my device as a clutch dynamo and a booster dynamo. It is understood, however, that I use these words in the broad sense, since the clutch dynamo, or the booster dynamo, is adapted to operate as a generator under one condition of operation and as a motor under another condition.

The auxiliary separately excited coil 6 is connected to and supplied with current from the regulating dynamo armature 11 which is mechanically driven by the load shaft 5. The regulating dynamo field coil 12 is separately energized by the battery 13 when the switch 14 is in the running position engaging the contact 15.

In operation, referring to Figures 1 and 2, if it is assumed that the load holds the shaft 5, and the armatures 4 and 11 connected thereto, stationary, and the internal combustion engine shaft is rotated, the clutch dynamo armature will have a current generated in it and thereby exert a torque upon the load. The current so generated also traverses the booster armature 2 and its series field coil 7, which is connected to produce motor action and exert a torque which reaches the clutch dynamo and the load so that the torque at the load is boosted beyond that supplied by the engine. As the load shaft 5 speeds up the regulating dynamo armature generates and supplies to the booster coil 6 an ever increasing current. This coil acts in opposition to the motoring coil 7 and gradually decreases the motoring flux in the booster field and the torque supplied by it until the forces in the two coils nullify each other, when the booster field flux disappears. At this point, the speed and torque of the load shaft nearly equals that of the prime mover. As the load shaft continues to speed up, the increasing regulating dynamo current to the coil 6 causes the booster flux to reverse. The booster has now become a generator and supplies electrical energy to the clutch dynamo, boosting its load speed beyond that of the engine.

It will be noted that the entire transition takes place automatically and that with the prime mover adjusted to operate at a fixed speed and limited torque a light load will be accompanied by a high load speed and as the load increases its speed will automatically drop and will be accompanied by an increased torque supplied to it. In motor vehicles this feature is very desirable in that on level roads it permits the vehicle to travel at a lively pace with only moderate and, therefore, economical engine speeds, while on grades the necessary increased torque is automatically forth-coming.

In order to still further increase the speed and torque range of the system and reduce the engine speed at light loads, I provide a regulator 16, Figure 1. It consists of a magnet yoke 17 provided with a series coil 18 which is traversed by the load current. The magnet armature 19 is fastened to a plunger 20 which varies the compression on the stack of resistance disks 21, such as a carbon pile, normally held under compression by the adjustable spring 22 so as to shunt current away from the booster coil 7 across which the stack is connected.

The regulator is operative to minimize motoring action of the booster on light loads when the load shaft is underspeeding and to minimize opposition of the force due to coil 7 when overspeeding on light load, thereby increasing generator action, with the result that on light loads the engine speed is decreased for a given load speed.

Where the direct action of series coil 7 is sufficient to accomplish the regulating function, the regulator 16 may be omitted.

It should be noted that the system normally permits the transfer of power only in one direction, that is from engine to load, so that whenever the accelerator is released the engine slows down to its idling speed and the vehicle runs free and unimpeded by engine drag.

Provision is made for decelerating the load by closing the switch 23 and shunting the armature 4 with the resistance 24. Inasmuch as the regulating dynamo on the rotating load shaft keeps the booster energized, the booster in turn energizes the clutch dynamo field 3 through the resistance 24. The current in the armature 4 reverses and also flows through the resistance 24. The load now drives the engine and booster and is thereby decelerated, the surplus energy being dissipated in the resistance.

As heretofore mentioned, the apparatus can be effectively used to start the prime mover. For this purpose the battery switch is thrown over to the contact 25, establishing one circuit across the armature 4 and another circuit, including the field coil 3 and the booster armature and coil 7, both units supplying the starting torque. As the prime mover starts, the booster counter potential decreases the current through field coil 3, endowing the clutch dynamo with series characteristics.

In order to prevent reversal of current and polarity a teaser battery cell 26 is provided connected across the field 3 through a resistance 27 by means of a switch 28. The field will only draw current at the start and when the drop across the field exceeds the battery voltage the latter will receive a charge and remain effective.

It should be noted that the rate of automatic change or characteristic of the system can be adjusted by the resistances 29 and 30 in the regulating dynamo circuits and the adjustable spring 22. These are important from the standpoint of adjustment of rate of automatic change between prime mover and load in accordance with the changed operating characteristics of the prime mover or the load. If the maximum torque of the power source is lowered as may happen, with an internal combustion engine when it becomes carbonized or when the engine is cold, an increase of resistance in the regulating dynamo armature or field circuits will lower the regulating current in the booster field coil, increase the engine speed and load current and produce a proportionately greater torque on the load shaft which compensates for the lowered torque of the power source. Another source of adjustment for changed operating conditions is found in the spring 22 of the magnet 17. An increase of tension in the spring 22 causes a lower engine speed with relation to load speed.

By the device of my invention, I am enabled to transfer power from a power source to a load shaft, and in the course of the transfer to vary the torque speed relationships comprising that power, to meet the torque demands of the load shaft. My device is adapted to the production of a torque greater than the torque of the power source, at a proportionately lower speed, when such torque is required by the load shaft, and to provide the load shaft with a speed greatly exceeding that of the power source when the torque demands on the load shaft are less than the torque ability of the power source. I am further able to vary the torque conversion in accordance with the changing torque requirements of the load, as well as by means actuated automatically in response to the speed of the load shaft. I am further able to adjust the rate of automatic change between prime mover and load. In addition, I am able to provide a braking effect upon the load shaft when needed.

The arrangement for changing the operation of one of the dynamos from a motor to a generator in response to variations in speed of one of the shafts is broadly claimed in my copending application Serial No. 645,997 for the reissue of Patent No. 1,784,308. Broad claims covering the transition arrangement where the control is in response to variations in speed of the load shaft are contained in the present application. The various arrangements for teasing the field of one of the dynamos, in combination with other features of the invention, are covered broadly and specifically in my copending applications Ser.

Nos. 645,997 and 645,999. The arrangement for electrically braking the load with the aid of engine friction is broadly claimed in my patent No. 1,820,862, and specific claims including this feature are included in the present application. Reference is also made to the following U. S. patents issued to me on copending applications relating to transmission systems of the same general type: 1,773,843 (Reissue 18,888); 1,773,844; 1,773,845; 1,820,863; 1,820,864.

While I have shown but a single embodiment of my invention in the accompanying description and drawing, it is capable of other embodiments and various modifications without departing from the spirit thereof; it is well suited for use with apparatus having reversible dynamos and differential gearing as for instance the apparatus shown in my application Serial No. 359,031, filed April 29, 1929, and it is desired, that only such limitations shall be imposed thereon as are required by the prior art or indicated by the appended claims.

I claim as my invention:

1. In a power transforming mechanism, a magnetic induction clutch comprising a rotative field and armature, associated between a power source and a load shaft, an electrodynamic booster, likewise having armature and field elements, and mechanically associated with the power source, and means for controlling the direction and amount of transfer of power through said booster, comprising an auxiliary field winding therein, and a regulating dynamo connected thereto and operatively associated with the load shaft, having an armature and a field, and means for the steady energization of said field, whereby a controlling current is produced by said regulating dynamo in accordance with the speed of the load shaft, and means comprising a variable resistance in shunt to the series field of said booster, and a magnetic control device cooperating therewith, for variably shunting current from the booster field as the load current varies.

2. In a power transforming mechanism, a magnetic induction clutch comprising a rotative field and armature, associated between a power source and a load shaft, an electrodynamic booster, likewise having armature and field elements, and mechanically associated with the power source, and means for controlling the transfer of power through said booster comprising an auxiliary field winding therein, and a regulating dynamo connected thereto and operatively associated with the load shaft, having an armature and a field, and means for the steady energization of said field, whereby a controlling current is produced by said regulating dynamo in accordance with the speed of rotation of the load shaft, and means comprising an adjustable resistance in shunt to the series field of said booster, a magnetic control device cooperating therewith, and connected in series with said booster armature for variably shunting current from the series field as the load current varies, and means comprising an adjustable spring for changing the value of the shunt current.

3. In a power transforming mechanism, a power shaft, a load shaft, a clutch dynamo interposed between said shafts and having a series field coil, a booster dynamo likewise having a series field coil, a load circuit including said dynamos and field coils, an auxiliary field winding on said booster dynamo, a regulating dynamo driven by said load shaft and connected to said auxiliary field winding and adapted to control the transfer of power from said booster dynamo in accordance with the speed of said load shaft, and means comprising a variable resistance and a controlling electromagnet cooperating therewith, connected to shunt current from the series field coil of said booster dynamo in accordance with the variations of the current flowing through the controlling magnet.

4. In combination, a power shaft, a variable speed load shaft, a dynamo rotatively associated with both shafts, a second dynamo rotatively associated with the power shaft and having pole pieces provided with series and auxiliary field coils, a load circuit including the first dynamo and the series field coil adapted to magnetize the field poles in motoring direction, a regulating generator rotatively connected with the load shaft and electrically connected to the auxiliary field coil adapted to variously magnetize the field poles in generating direction and operative by the variation in its speed of rotation to reverse the magnetism in the field poles from one direction to the other direction.

5. In combination, a power shaft, a load shaft, a dynamo rotatively associated with both shafts, a second dynamo rotatively associated with the power shaft having pole pieces provided with series and auxiliary field coils, a regulating generator rotatively connected with the load shaft and electrically connected to the auxiliary field coil, a load circuit including the first dynamo and the series field coil, and means for shunting the series field coil.

6. In combination, a variable speed engine shaft, a variable speed load shaft, a reversible dynamo rotatively connected with both shafts, a second dynamo rotatively connected with the engine shaft, an electric load circuit including the dynamos, and means responsive to the variations in the speed of the load snaft for causing the second mentioned dynamo to act as a generator, said second mentioned dynamo including means operative in accordance with the current in the load circuit for causing said second mentioned dynamo to operate as a motor.

7. In combination, a variable speed engine shaft, a variable speed load shaft, a reversible dynamo rotatively connected with both shafts, a second dynamo rotatively connected with the engine shaft, an electric load circuit including the dynamos, means responsive to the variations in the speed of the load shaft for causing the second mentioned dynamo to act as a generator, said second mentioned dynamo including means for causing said second mentioned dynamo to operate as a motor, and additional means responsive to the variations of the current in the load circuit for controlling said means for causing the second mentioned dynamo to act as a motor.

8. In combination, a power shaft, a load shaft, a unidirectionally rotating dynamo, a reversible second dynamo cooperating with the first dynamo for transmitting power between the shafts, electric connections for self exciting the dynamos and adapted for operation of the first dynamo as a motor and the second dynamo as a generator in one stage, and means including a regulating generator rotatively connected with the load shaft adapted by the variation in the speed of the regulating generator to change the first dynamo to a generator and the second dynamo to a motor for operation in another stage.

9. In combination, an engine shaft, a load shaft, a unidirectionally rotating dynamo having pole pieces, a reversible second dynamo having a field element and adapted to cooperate with the first dynamo for transmitting power from engine shaft to load shaft, a regulating generator rotatively connected with the load shaft, means for varying the magnetization in said field element substantially in proportion to the load on the load shaft, means for magnetizing said pole pieces in motoring direction adapted to establish a predetermined torque increase to the load shaft for operation of the load shaft at a relatively low speed and means adapted by the variation in the speed of the regulating generator to reverse the transfer of electric power between the dynamos for operation of the load shaft at a relatively higher speed.

10. In combination, a variable speed power shaft, a variable speed load shaft, a dynamo rotatively connected to the power shaft and having a field element provided with a plurality of field coils, a reversible second dynamo rotatively connected with both shafts and having a field element provided with a field coil, a load circuit including a field coil on each dynamo adapted to magnetize both field elements substantially in proportion to the load on the load shaft and means including a variable speed regulating generator rotatively connected with the load shaft adapted by the variation in the speed of the regulating generator to reverse the magnetic flux in the field element of the first dynamo.

11. In combination, a variable speed power shaft, a variable speed load shaft, a reversible dynamo rotatively connected with both shafts, a second dynamo rotatively connected in fixed speed relation with the power shaft and having a series field coil, an electric load circuit including the dynamos and the series field coil connected in motoring direction, and means responsive to the variations in the speed of the load shaft for causing the second mentioned dynamo to act as a generator.

12. In combination, a power shaft, a load shaft, a unidirectionally rotating dynamo connected in fixed speed relation with the power shaft, a reversible second dynamo connected with both shafts and cooperating with the first dynamo for transmitting power between the shafts, electric connections for self exciting the dynamos and adapted for operation of the first dynamo as a motor and the second dynamo as a generator in one stage, and means responsive to the variation in the speed of the load shaft to change the first dynamo to a generator and the second dynamo to a motor for operation in another stage.

13. In combination, a variable speed power shaft, a variable speed load shaft, a dynamo rotatively connected in fixed speed relation to the power shaft and having a field element provided with a field coil, a reversible second dynamo rotatively connected with both shafts, a load circuit including said dynamos and field coil adapted to magnetize said field element substantially in proportion to the load on the load shaft, and means including a variable speed regulating generator rotatively connected with the load shaft adapted by the variation in the speed of the regulating generator to reverse the magnetic flux in the field element of the first dynamo.

14. In combination, a power shaft, a load shaft, a dynamo rotatively associated with both shafts, a second dynamo rotatively associated in fixed speed relation with the power shaft and having pole pieces provided with series and auxiliary field coils, an auxiliary generator driven by the load shaft and connected to the auxiliary field coil to magnetize the field poles in generating direction, a load circuit including the first dynamo and series field coil adapted to magnetize the field poles in motoring direction, and means for shunting the series field coil effective to reverse the magnetism in the field poles from motoring direction to generating direction.

15. In combination, a power shaft, a load shaft, a dynamo operatively connected in fixed speed relation with one of the shafts having a field element provided with a plurality of field coils, a reversible second dynamo rotatively connected with both shafts having a field element provided with a field coil, a load circuit including a field coil on each dynamo for establishing magnetomotive forces in the field elements substantially in proportion to current in the load circuit having motoring direction in the first dynamo and generating direction in the second dynamo, a variable speed regulating generator rotatively connected with the load shaft and electrically connected to a second field coil on the field element of the first dynamo and adapted by the variation in its speed of rotation to reverse the magnetism in the field element of the first dynamo with respect to that in the second dynamo.

16. In combination, a power shaft, a load shaft, two dynamo electric machines adapted to transmit power between the shafts, a variable potential auxiliary generator rotatively connected with the load shaft, and means operated by variations of the auxiliary generator potential adapted to reverse the voltage with respect to the current in one of the dynamos.

17. The means for uninterruptedly accelerating a load, which includes a power shaft, a load shaft, a reversible dynamo rotatively connected with both shafts, a unidirectionally rotating second dynamo rotatively connected in fixed speed relation with the power shaft, a closed load circuit including both dynamos, a regulating dynamo connected with the load shaft and means including said regulating dynamo for varying the rate of acceleration of the power shaft with respect to the rate of acceleration of load shaft.

18. In combination, a power shaft, a load shaft, a dynamo rotatively connected with both shafts, a second dynamo rotatively connected in fixed speed relation with the power shaft, a variable speed regulating dynamo rotatively connected with the load shaft, means including the regulating dynamo for operating the second dynamo as a motor when the speed of regulating dynamo is relatively low and for operating the second dynamo as a generator when the speed of regulating dynamo is relatively high.

19. A transmission system including an engine having a shaft, a load shaft, a dynamo connected in fixed speed relation with the engine shaft, a second dynamo connected in varying speed relation with both shafts, a regulating generator driven by the load shaft, a closed load circuit connecting said dynamos, means including the regulating generator for controlling the operation of the first dynamo for the unidirectional transmission of power from the engine to the load shaft, and means for reversing the power flow to decelerate the load shaft by engine friction while maintaining the continuity of the load circuit connecting said dynamos.

20. A system for accelerating and decelerating a load including an engine having a shaft, a load shaft, a dynamo connected in fixed speed relation with the engine shaft, a second dynamo connected in varying speed relation with both shafts having armature and field elements, a regulating generator, a closed load circuit including the dynamos, means including the regulating generator for changing the operation of the first dynamo from a motor in one stage to a generator in another stage in response to variations in the speed of the load shaft for accelerating the load shaft, and means for establishing an auxiliary load circuit in parallel circuit relation with one of the elements of the second dynamo for decelerating the load shaft with engine friction.

21. A system for accelerating and decelerating a load including an engine having a shaft, a load shaft, a dynamo connected in fixed speed relation with the engine shaft, a second dynamo connected in varying speed relation with both shafts having an armature and a series field coil, a regulating generator, a closed load circuit including the dynamos and the series field coil, means including the regulating generator for changing the operation of the first dynamo from a motor in one stage to a generator in another stage in response to variations in the speed of the load shaft for accelerating the load shaft, and means for decelerating the load with engine friction including an auxiliary circuit connected in parallel with the armature of the second dynamo.

22. A transmission system including an engine having a shaft, a load shaft, a dynamo connected in fixed speed relation with the engine shaft and having a series field coil, a second dynamo connected in varying speed relation with both shafts, a closed load circuit connecting said dynamos including said series field coil connected in motoring direction, a regulating generator driven by the load shaft and electrically connected with said first dynamo and being operable in response to speed variations of the load shaft to change the operation of the first dynamo from a motor to a generator for the unidirectional transmission of power from the engine to the load shaft, and means for at-will reversing the power flow to decelerate the load shaft by engine friction while maintaining the continuity of the load circuit connecting said dynamos.

23. In combination, a power shaft, a load shaft, a dynamo rotatively connected in fixed speed relation with the power shaft, a reversible second dynamo rotatively connected in variable speed relation with both shafts, a load circuit connecting said dynamos, means tending to variably magnetize the first dynamo in one direction in accordance with the current variations in said load circuit, and means tending to variably magnetize the first dynamo in the opposite direction in accordance with speed variations of the load shaft.

24. In combination, a power shaft, a variable speed load shaft, a reversible dynamo rotatively connected with both shafts, a second dynamo rotatively connected in fixed speed relation with the power shaft and having a series field coil, a load circuit including the dynamos and the series field coil connected in motoring direction, means responsive to speed variations of the load shaft tending to magnetize the second dynamo in a generating direction, a variable resistance element connected in shunt to said series field coil, and means responsive to an increase in current in said load circuit for increasing the resistance of said variable resistance.

ALFONS H. NEULAND.